(12) United States Patent
Kumata et al.

(10) Patent No.: US 11,376,944 B2
(45) Date of Patent: Jul. 5, 2022

(54) REACTOR COOLING DEVICE

(71) Applicant: DENSO CORPORATION, Kariya (JP)

(72) Inventors: Satoko Kumata, Kariya (JP); Kenshiro Hida, Kariya (JP); Shintaro Kogure, Kariya (JP)

(73) Assignee: DENSO CORPORATION, Kariya (JP)

( * ) Notice: Subject to any disclaimer, the term of this patent is extended or adjusted under 35 U.S.C. 154(b) by 116 days.

(21) Appl. No.: 16/799,167

(22) Filed: Feb. 24, 2020

(65) Prior Publication Data

US 2020/0194136 A1 Jun. 18, 2020

Related U.S. Application Data

(63) Continuation of application No. PCT/JP2018/031415, filed on Aug. 24, 2018.

(30) Foreign Application Priority Data

Aug. 25, 2017 (JP) .............................. JP2017-162368

(51) Int. Cl.
*B60K 11/02* (2006.01)
(52) U.S. Cl.
CPC .................................... *B60K 11/02* (2013.01)
(58) Field of Classification Search
CPC ................................ B60K 11/02; B60K 11/04
See application file for complete search history.

(56) References Cited

U.S. PATENT DOCUMENTS

| 7,800,260 | B2 * | 9/2010 | Komatsu | F16H 57/02 |
| | | | | 180/65.1 |
| 8,397,845 | B2 * | 3/2013 | Yoshida | H02K 9/19 |
| | | | | 180/65.22 |
| 8,875,825 | B2 * | 11/2014 | Asakura | H02K 9/19 |
| | | | | 310/52 |
| 9,849,791 | B2 * | 12/2017 | Suzuki | F16H 61/0006 |
| 2009/0250271 | A1 | 10/2009 | Komatsu et al. | |
| 2010/0175933 | A1 | 7/2010 | Yoshida | |

OTHER PUBLICATIONS

Oct. 2018 Search Report issued in International Patent Application No. PCT/JP2018/031415.

* cited by examiner

*Primary Examiner* — John D Walters
(74) *Attorney, Agent, or Firm* — Oliff PLC

(57) ABSTRACT

A reactor cooling device includes a housing, a reactor arranged in the housing, and a rotating body which is rotationally located below the reactor in the housing. The rotating body and the reactor are located so as to at least partially overlap with each other in a previously selected one of turning radius directions of the rotating body. A part of the rotating body is immersed in the coolant stored in the housing. The reactor cooling device is configured to cause a part of the coolant splashed by the rotation of the rotating body to be in contact with the reactor to thereby cool the reactor.

6 Claims, 7 Drawing Sheets

REACTOR COOLING DEVICE

CROSS-REFERENCE TO RELATED APPLICATION

The present application is a continuation application of International Application No. PCT/JP2018/031415, filed on Aug. 24, 2018, which claims priority to Japanese Patent Application No. 2017-162368 filed on Aug. 25, 2017. The contents of these applications are incorporated herein by reference in their entirety.

BACKGROUND

Technical Field

The present disclosure relates to a reactor cooling device that causes coolant to be in contact with a reactor to cool the reactor.

Background Art

In a structure that causes a lubricant to come into contact with a reactor to cool the reactor, the reactor provided in a drive unit of a vehicle is cooled by the lubricant in the drive unit.

SUMMARY

In the present disclosure, provided is a reactor cooling device as the following. The reactor cooling device is configured to cause a part of a coolant splashed by the rotation of a rotating body to be in contact with a reactor to thereby cool the reactor, a housing has an inner wall surface portion, the reactor is arranged to extend along part of the inner wall surface portion of the housing, the inner wall surface portion of the housing includes an inner wall surface that faces the reactor in the previously selected turning radius direction of the rotating body, and the reactor includes an front-side outer side surface that faces the inner wall surface, the reactor cooling device comprising: a coolant flow passage defined between the inner wall surface and the front-side outer side surface facing each other, the coolant flow passage being arranged to enable the part of the coolant splashed by the rotating body to flow therethrough.

BRIEF DESCRIPTION OF THE DRAWINGS

The object of the present disclosure, other objects, features, and advantages will become more apparent by the following detailed description with reference to the accompanying drawings in which.

DETAILED DESCRIPTION OF THE PREFERRED EMBODIMENTS

Figure 1:
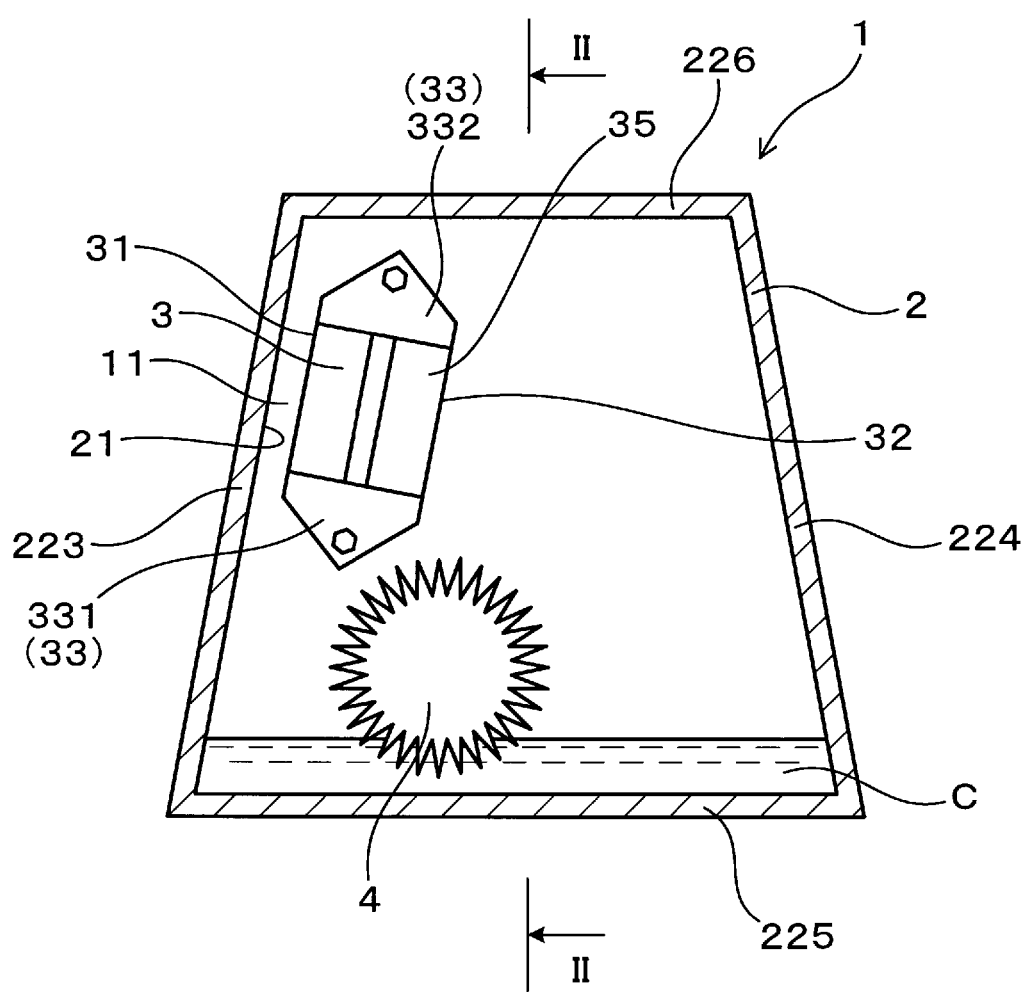
FIG. 1 is a cross-sectional explanatory diagram of a reactor cooling device according to a first embodiment.

A structure that causes a lubricant to come into contact with a reactor to cool the reactor is disclosed in PTL 1. In the structure disclosed in PTL 1, the reactor provided in a drive unit of a vehicle is cooled by the lubricant in the drive unit. More specifically, the lubricant is splashed in accordance with the rotation of a differential gear and adheres to a deceleration gear located above. The lubricant that is adhered to the deceleration gear is further thrown upward in accordance with the rotation of the deceleration gear. The lubricant that is thrown above the reactor by the differential gear and the deceleration gear flows through an oil passage into an oil chamber and cools the reactor.

[PTL 1] Japanese Laid-Open Patent Publication No. 2007-129794

The structure disclosed in PTL 1 causes the lubricant to reach the reactor via the differential gear and the deceleration gear and even via the oil passage and the oil chamber. This complicates the structure and reduces the flexibility in design. The manufacturing costs are also likely to increase.

The present disclosure is intended to provide a reactor cooling device that is likely to reduce costs with a simple structure.

One aspect of the present disclosure provides a reactor cooling device including: a housing in which a coolant is stored; a reactor that is arranged in the housing; and a rotating body that is rotationally located below the reactor in the housing, wherein, the rotating body and the reactor are located so as to at least partially overlap with each other in a previously selected one of turning radius directions of the rotating body, a part of the rotating body is immersed in the coolant stored in the housing, the reactor cooling device is configured to cause a part of the coolant splashed by the rotation of the rotating body to be in contact with the reactor to thereby cool the reactor, the housing has an inner wall surface portion, the reactor is arranged to extend along part of the inner wall surface portion of the housing, the inner wall surface portion of the housing includes an inner wall surface that faces the reactor in the previously selected turning radius direction of the rotating body, and the reactor includes an front-side outer side surface that faces the inner wall surface, the reactor cooling device comprising: a coolant flow passage defined between the inner wall surface and the front-side outer side surface facing each other, the coolant flow passage being arranged to enable the part of the coolant splashed by the rotating body to flow therethrough.

In the reactor cooling device, the rotating body and the reactor are located so as to at least partially overlap with each other in a previously selected one of turning radius directions of the rotating body. Thus, the coolant that is splashed in accordance with the rotation of the rotating body continuously comes into contact with the reactor.

In this manner, the reactor cooling device is configured to cause a part of the coolant splashed by the rotation of the rotating body to be in contact with the reactor to thereby cool the reactor. Thus, the reactor is efficiently cooled with a simple structure. Additionally, the costs of the reactor cooling device are likely to be reduced.

As described above, it is an object of the above-described aspect to provide a reactor cooling device that is likely to reduce the costs with a simple structure.

Reference signs in parentheses given in claims indicate the correspondence to specific means described in the embodiment described below and do not limit the technical range of the present disclosure.

First Embodiment

A reactor cooling device according to an embodiment will be described with reference to FIGS. 1 to 4.

As shown in FIG. 1, a reactor cooling device 1 of the present embodiment includes a housing 2, a reactor 3, which is located in the housing 2, and a rotating body 4. The rotating body 4 is rotationally located below the reactor 3 in the housing 2.

Figure 2:
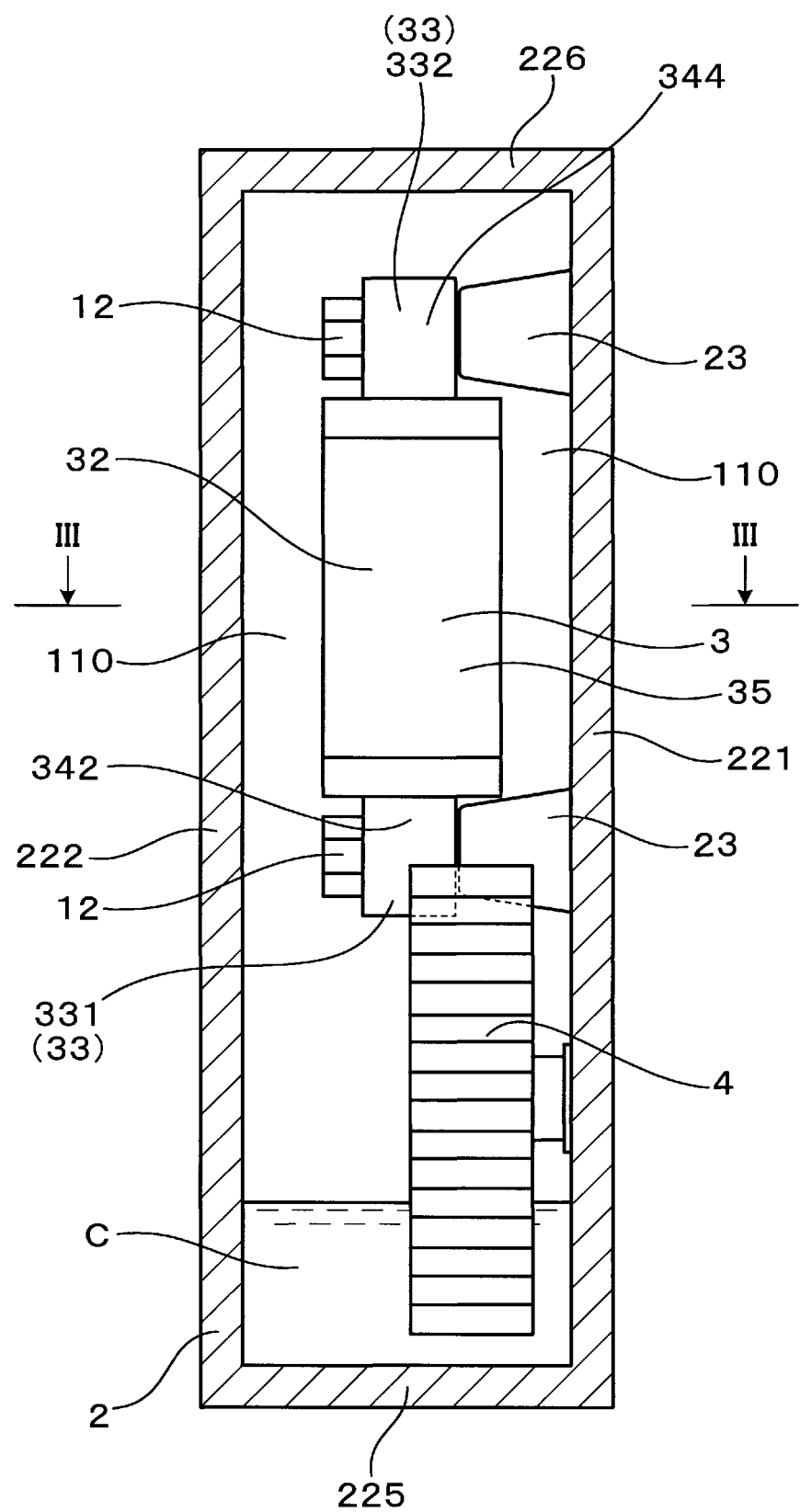
FIG. 2 is a cross-sectional view taken along line II-II of FIG. 1.

As shown in FIG. 2, the rotating body 4 and the reactor 3 are arranged so as to at least partially overlap with each other in a predetermined turning radius direction of the rotating body 4.

As shown in FIGS. 1 and 2, part of the rotating body 4 is immersed in coolant C stored in the housing 2.

The reactor cooling device 1 is configured to cause a part of the coolant C splashed by the rotation of the rotating body 4 to be in contact with the reactor 3 to thereby cool the reactor 3.

Figure 3:
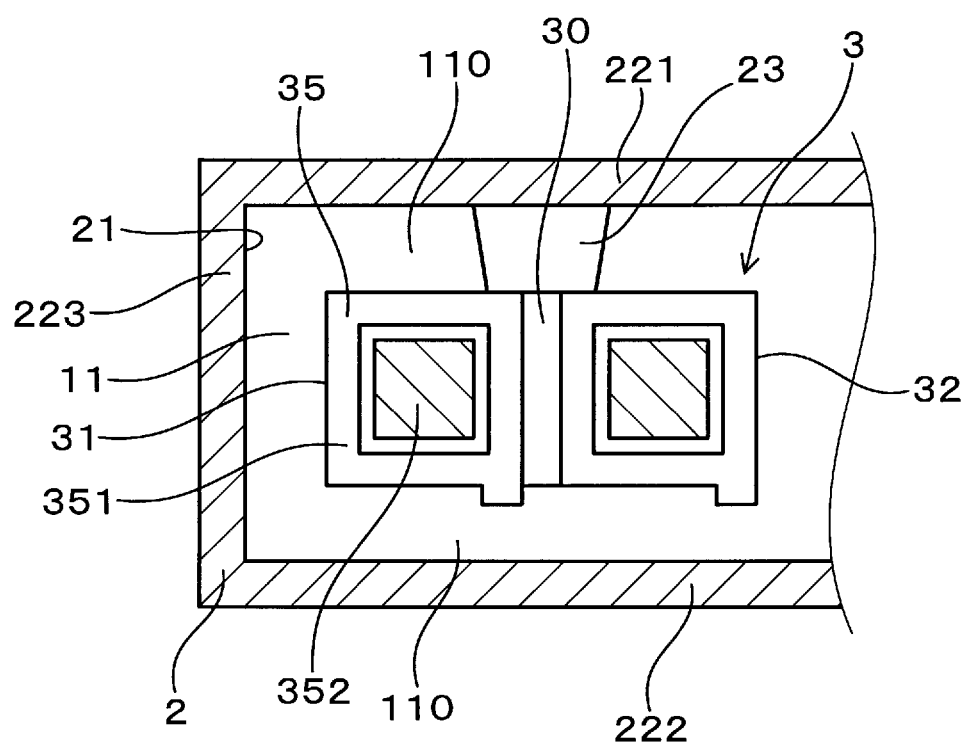
FIG. 3 is a cross-sectional view taken along line III-III of FIG. 2.
Figure 4:
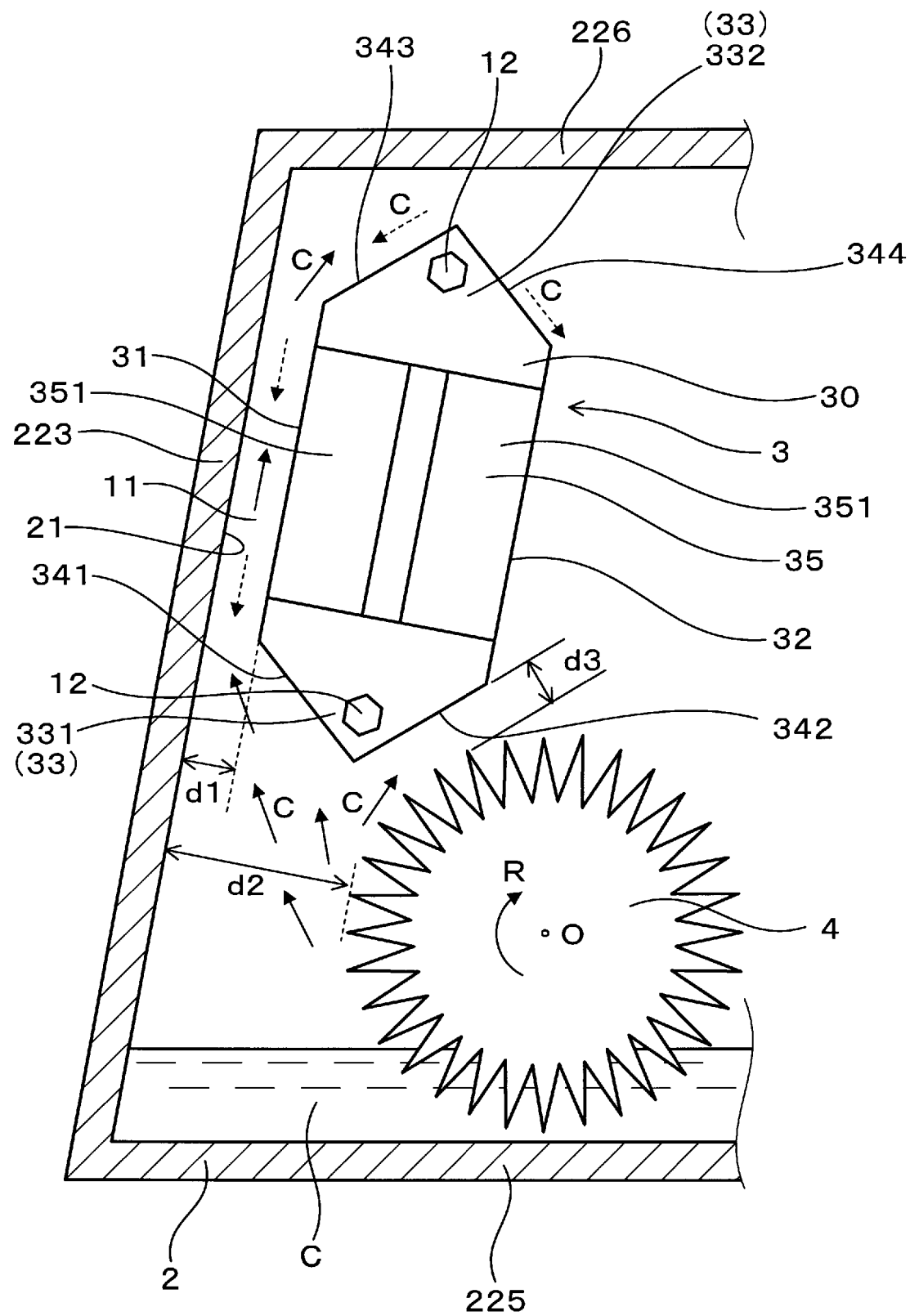
FIG. 4 is a partially enlarged cross-sectional view of FIG. 1.

The reactor 3 is located to extend along part of the inner wall surface of the housing 2. As shown in FIGS. 1, 3, and 4, the reactor 3 has a front side surface 31, and the inner wall surface has a wall surface 21 located to face the front side surface 31 of the reactor 3 in a predetermined turning radius direction of the rotating body 4. A coolant flow passage 11 is formed between the wall surface 21 and the front side surface 31. A part of the coolant C splashed by the rotating body 4 flows through the coolant flow passage 11.

As shown in FIG. 4, a distance d1 between the front side surface 31 and the wall surface 21 in the coolant flow passage 11 is shorter than a distance d2 between the rotating body 4 and the wall surface 21. As used herein, the distances d1 and d2 refer to the distances in the direction of a normal to the wall surface 21.

The reactor 3 includes a heating section 35, which produces heat, and a securing section 33 for securing it to the housing 2. The securing section 33 includes at least a lower securing section 331, which is located below the heating section 35. The lower securing section 331 includes a front-side lower guide surface 341, which is formed to be connected to the front side surface 31.

The reactor 3 includes a rear side surface 32, which is opposite to the front side surface 31. The lower securing section 331 includes a rear-side lower guide surface 342, which is formed to be connected to the rear side surface 32.

The securing section 33 further includes an upper securing section 332, which is located above the heating section 35. The upper securing section 332 includes an front-side upper guide surface 343, which is connected to the front side surface 31, and a rear-side upper guide surface 344, which is connected to the rear side surface 32.

The reactor cooling device 1 of the present embodiment includes the reactor 3, which is located in a transaxle, and the rotating body 4, which is a gear in this embodiment. The case of the transaxle corresponds to the housing 2. The lubricant for lubricating, for example, gears in the transaxle corresponds to the coolant C. Besides the reactor 3 and the rotating body 4, other gears, electronic components, and mechanical elements, and the like are located in the housing 2, but are not shown.

Although not shown, an inverter that controls and drives a motor that supplies drive force to the transaxle is located in the vicinity of the transaxle. The component of the inverter located in the transaxle may be referred to as the reactor 3.

As described above, the rotating body 4 is a gear, which is substantially disk-shaped and includes multiple teeth on the outer circumferential surface. The rotating body 4 is pivotally supported at its central section to rotate with respect to the housing 2. More specifically, the rotating body 4 rotates in the direction of arrow R in FIG. 4 about a rotational center O. The rotating body 4 is partially immersed in the coolant C stored in the lower section of the housing 2. In the present embodiment, the rotational center O of the rotating body 4 is located above the liquid surface of the coolant C.

As shown in FIGS. 2 and 3, the housing 2 includes a first wall 221 and a second wall 222, which face each other, on both sides in the rotation axis direction of the rotating body 4. The first wall 221 and the second wall 222 are connected at their lower ends by a bottom wall 225 and are connected at their upper ends by a ceiling wall 226. The housing 2 has a third wall 223 and a fourth wall 224. Each of the first and second walls 221 and 222 has opposing first and second ends in a direction orthogonal to the vertical direction and the rotational axis direction. As shown in FIGS. 1 and 3, The first ends of the respective first and second walls 221 and 222 are jointed to the third wall 223, and the second ends of the respective first and second walls 221 and 222 are joined to the fourth wall 224. The third wall 223 and the fourth wall 224 are inclined inward as they extend upward. The shape of the housing 2 shown in FIGS. 1 to 4 is a schematic shape and is not limited particularly to this shape.

The rotating body 4 is located at a position relatively low in the housing 2. The reactor 3 is fixed to the first wall 211 above the rotating body 4. The reactor 3 is secured to the housing 2 by two securing sections 33. As shown in FIG. 2, the housing 2 includes two bosses 23, which project inward from the first wall 221. The lower securing section 331 and the upper securing section 332 are abutted against the bosses 23, respectively. Bolts 12 are respectively inserted in insertion holes respectively formed in the lower securing section 331 and the upper securing section 332, and are screwed to internal threads formed in the bosses 23 to be fastened. Thus, the reactor 3 is secured to the first wall 221 of the housing 2.

As shown in FIG. 3, the heating section 35 of the reactor 3 includes coils 351 and cores 352 each located in the associated coil 351. As shown in FIGS. 3 and 4, the coils 351 are arranged in two rows, and the two rows of the coils 351 are electrically connected to each other in series. The coils 351 and the cores 352 are integrated by a molding resin 30. The molding resin 30 includes the two securing sections 33, which are integrally formed with the molding resin 30. That is, the securing sections 33 are formed of part of the molding resin 30. The securing sections 33 have a thickness smaller than that of the heating section 35 in a direction parallel to the rotation axis direction of the rotating body 4. Each securing section 33 includes an insertion hole extending through the securing section 33 in the thickness direction. Each bolt 12 inserted in each insertion hole is fastened to the corresponding one of the bosses 23, so that the reactor 3 is secured at the securing sections 33.

The securing sections 33 are formed so that the end surface of each securing section 33 parallel to the thickness direction is continuous with the associated side surface of the heating section 35. That is, the front-side lower guide surface 341 and the rear-side lower guide surface 342 are formed on the end surface of the lower securing section 331.

The front-side upper guide surface 343 and the rear-side upper guide surface 344 are formed on the end surface of the upper securing section 332.

As shown in FIGS. 3 and 4, the reactor 3 is located such that the side surface of part of the heating section 35 extends along the inner wall surface of the third wall 223. That is, the inner wall surface of the third wall 223 serves as the wall surface 21, and the side surface of part of the heating section 35 of the reactor 3 serves as the front side surface 31. The distance d1 between the wall surface 21 and the front side surface 31 is, for example, approximately 10 mm or less. The space between the wall surface 21 and the front side surface 31 serves as the coolant flow passage 11.

The front side surface 31 is formed on the side surface of one of the two rows of the coils 351, which constitute the heating section 35 of the reactor 3. That is, the arrangement direction of the two rows of the coils 351 corresponds to a direction of a normal to the wall surface 21. Thus, the rear side surface 32 is formed on the side surface of the other one of the two rows of the coils 351.

As described above, since the third wall 223 is inclined with respect to the vertical direction, the reactor 3, which is located along the third wall 223, is also inclined with respect to the vertical direction. That is, the front side surface 31 and the rear side surface 32 of the reactor 3 are inclined with respect to the vertical direction. The front side surface 31 faces diagonally upward, and the rear side surface 32 faces diagonally downward.

In the present embodiment, a distance d3 between the reactor 3 and the rotating body 4 is smaller than the radius of the rotating body 4. The upper end of the rotating body 4 is located above the lower end of the reactor 3.

As shown in FIG. 2, a part of the rotating body 4 is arranged so as to overlap with the reactor 3 in a predetermined turning radius direction of the rotating body 4. In the turning radius direction, another part of the rotating body 4 is arranged so as not to overlap with the reactor 3 A circular side surface of the rotating body 4 can be located to entirely face the reactor 3.

As shown in FIGS. 2 and 3, the reactor 3 is also located close to the first wall 221 and the second wall 222 of the housing 2. Thus, the space between the heating section 35 of the reactor 3 and the first wall 221 and the space between the heating section 35 of the reactor 3 and the second wall 222 also serve as coolant flow passages 110. That is, in the present embodiment, the above-described coolant flow passages 110 are also formed besides the coolant flow passage 11 which is formed between the front side surface 31 of the reactor 3 and the wall surface 21 of the housing 2.

The reactor 3 is cooled as the coolant C flows through the coolant flow passage 11 and the coolant flow passages 110. The coolant C may come into contact with the surfaces other than the surfaces of the reactor 3 facing the coolant flow passage 11 and the coolant flow passages 110. That is, the coolant C also comes into contact with the rear side surface 32. Thus, the reactor 3 is cooled also from the rear side surface 32.

In particular, in the present embodiment, the coolant C serves also as the lubricant, and the lubricant is made to efficiently adhere to the heating section 35 of the reactor 3. Thus, while the inside of the transaxle is lubricated, the reactor 3 is also cooled.

Subsequently, the operational advantages of the present embodiment will be described.

In the above-described reactor cooling device 1, the rotating body 4 and the reactor 3 are arranged so as to at least partially overlap with each other in a predetermined turning radius direction of the rotating body 4. This allows the coolant C splashed by the rotation of the rotating body 4 to continuously come into contact with the reactor 3.

In this manner, the reactor cooling device is configured to cause a part of the coolant C splashed by the rotation of the rotating body 4 to be in contact with the reactor 3 to thereby cool the reactor 3. Thus, the reactor 3 is efficiently cooled with a simple structure. Additionally, the costs for the reactor cooling device 1 are likely to be reduced.

The reactor 3 is located along part of the inner wall surface of the housing 2. The coolant flow passage 11 is formed between the wall surface 21 of the housing 2 and the front side surface 31 of the reactor 3. Thus, the coolant C splashed by the rotating body 4 flows through the coolant flow passage 11 efficiently, so that the reactor 3 is efficiently cooled. That is, as shown in FIG. 4, the stored coolant C is splashed in accordance with the rotation of the rotating body 4. The splashed coolant C moves so as to creep up along the wall surface 21. Since the wall surface 21 and the front side surface 31 are located close to each other to define the coolant flow passage 11 therebetween, the coolant C creeps up along the coolant flow passage 11 while coming into contact with the reactor 3 efficiently. Some of the coolant C splashed by the rotating body 4 also moves upward of the reactor 3 through other passages. The coolant C that has moved above the reactor 3 adheres to, for example, the inner wall surface of the ceiling wall 226. Subsequently, the coolant C flows down by gravity as shown by broken arrows C. At this time also, the coolant C drips down the front side surface 31 of the reactor 3 along the coolant flow passage 11. Consequently, the reactor 3 is efficiently cooled.

The distance d1 between the front side surface 31 and the wall surface 21 in the coolant flow passage 11 is shorter than the distance d2 between the rotating body 4 and the wall surface 21. Thus, the coolant C that has entered the coolant flow passage 11 is likely to efficiently come into contact with the front side surface 31 of the reactor 3.

The lower securing section 331 of the reactor 3 includes the front-side lower guide surface 341, which is formed to be connected to the front side surface 31. Thus, when some of the coolant C splashed by the rotating body 4 hits the lower securing section 331 of the reactor 3, the coolant C is smoothly guided to the front side surface 31. That is, the coolant C that has hit the lower securing section 331 is guided to the front side surface 31 along the front-side lower guide surface 341. Thus, a larger amount of the coolant C is guided to the front side surface 31, so that the reactor 3 is likely to be cooled efficiently.

The lower securing section 331 of the reactor 3 includes the rear-side lower guide surface 342, which is formed to be connected to the rear side surface 32. Thus, the coolant C that has hit the lower securing section 331 is also smoothly guided to the rear side surface 32. That is, the coolant C that has hit the lower securing section 331 is guided to the rear side surface 32 along the rear-side lower guide surface 342. Thus, a larger amount of the coolant C is guided to the rear side surface 32. As a result, the heating section 35 of the reactor 3 is easily cooled from both the front side surface 31 and the rear side surface 32. As a result, the cooling efficiency of the reactor 3 is further improved.

Furthermore, the upper securing section 332 of the reactor 3 includes the front-side upper guide surface 343, which is connected to the front side surface 31, and the rear-side upper guide surface 344, which is connected to the rear side surface 32. Thus, as described above, when the coolant C that has moved above the reactor 3 flows down, the coolant C is smoothly guided to the front side surface 31 and the rear side surface 32 of the reactor 3. That is, the coolant C that has moved to the upper section first adheres to the upper securing section 332. At this time, the coolant C that has reached the front-side upper guide surface 343 is guided smoothly to the front side surface 31. The coolant C that has reached the rear-side upper guide surface 344 is guided smoothly to the rear side surface 32. In this manner, the coolant C that flows down from above the reactor 3 is also guided to the front side surface 31 and the rear side surface 32 efficiently.

In the present embodiment, the coolant C also flows between the reactor 3 and the first wall 221 and between the reactor 3 and the second wall 222. Thus, the reactor 3 is also cooled by the coolant C from the surface of the reactor 3 facing the first wall 221 and the surface of the reactor 3 facing the second wall 222.

As described above, the present embodiment provides the reactor cooling device that is likely to reduce the costs with a simple structure.

Second Embodiment

Figure 5:
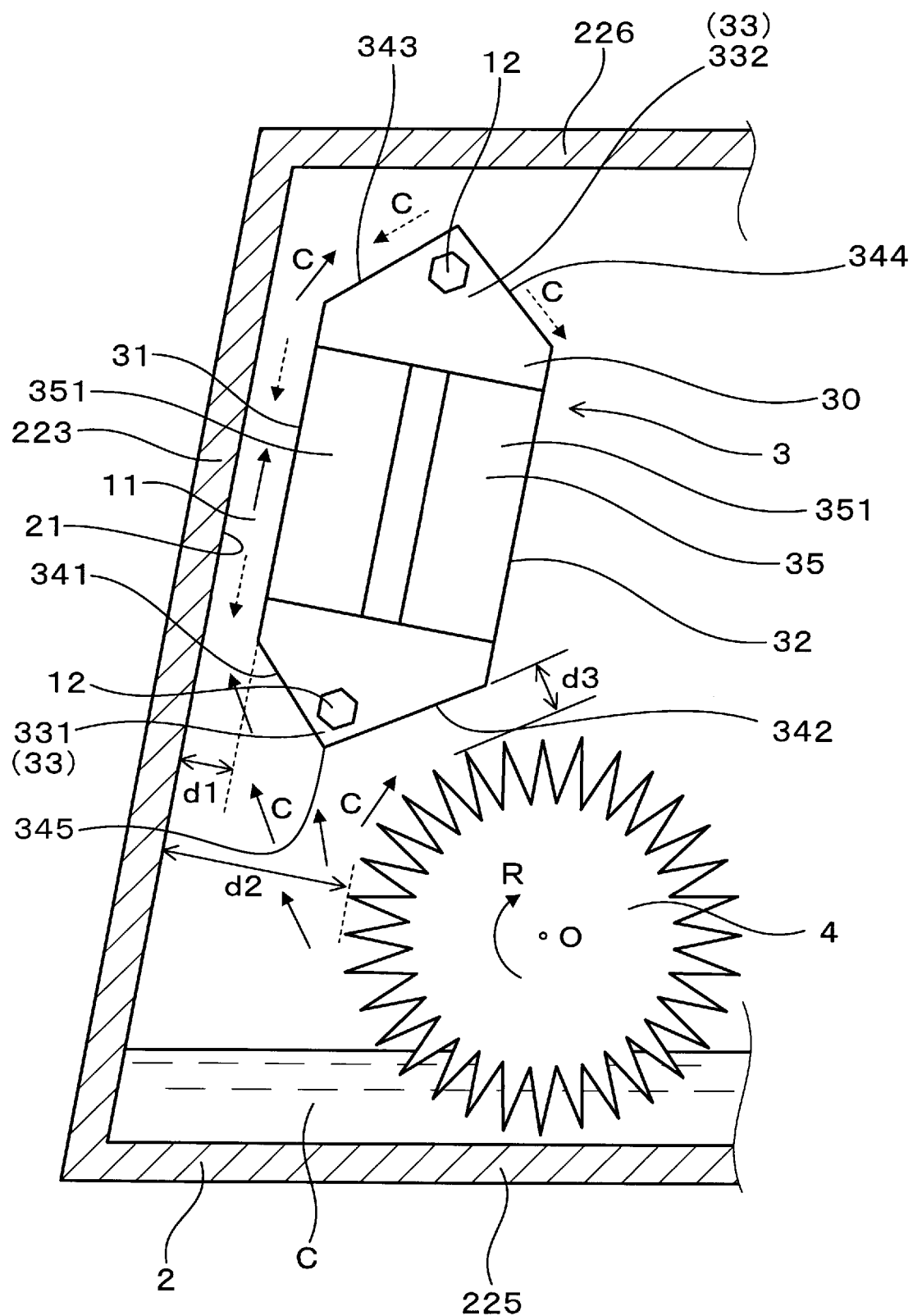
FIG. 5 is a cross-sectional explanatory diagram illustrating part of a reactor cooling device according to a second embodiment.

As shown in FIG. 5, in the present embodiment, the front-side lower guide surface 341 and the rear-side lower guide surface 342 have a boundary 345 therebetween, and the boundary 345 is closer to the front side surface 31 than to the center of the heating section 35 in the normal direction of the front side surface 31.

The area of the rear-side lower guide surface 342 is larger than the area of the front-side lower guide surface 341.

Other structures are the same as those of the first embodiment. The reference signs used in and after the second embodiment that are the same as the reference signs in the previously described embodiment refer to the same components as those in the previously described embodiment unless otherwise specified.

In the present embodiment, a larger amount of the coolant C splashed by the rotating body 4 is guided to the rear side surface 32 along the rear-side lower guide surface 342. As a result, the heating section 35 of the reactor 3 is more efficiently cooled from both the front side surface 31 and the rear side surface 32.

Additionally, the operational advantages that are the same as those of the first embodiment are obtained.

Third Embodiment

Figure 6:
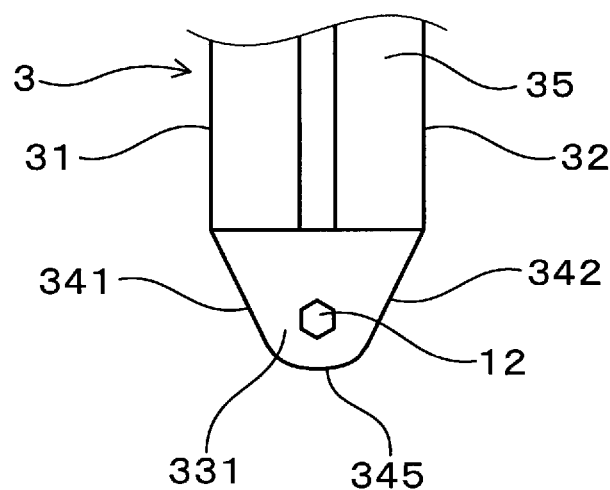
FIG. 6 is an explanatory plan view of a lower securing section according to a third embodiment.
Figure 7:
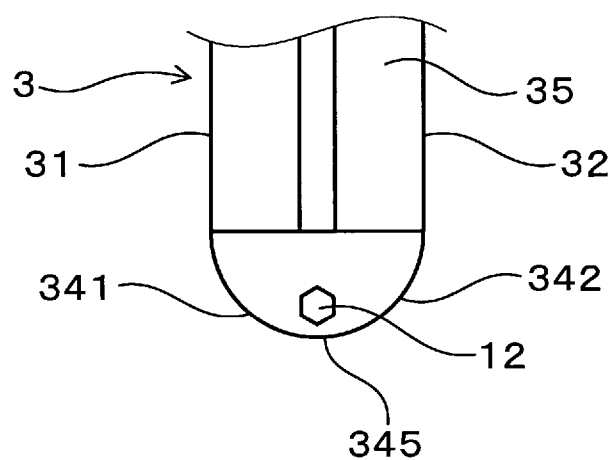
FIG. 7 is an explanatory plan view of another lower securing section according to the third embodiment.

As shown in FIGS. 6 and 7, the present embodiment uses a curved surface for the outer shape of the lower securing section 331.

That is, as shown in FIG. 6, the boundary 345 between the front-side lower guide surface 341 and the rear-side lower guide surface 342 of the lower securing section 331 is curved. Thus, while including a flat section, the front-side lower guide surface 341 and the rear-side lower guide surface 342 each include a curved section in the vicinity of the boundary 345. Consequently, the front-side lower guide surface 341 and the rear-side lower guide surface 342 are connected to each other smoothly.

The entire lower securing section 331 shown in FIG. 7 has a substantially arcuate shape. Thus, the front-side lower guide surface 341 and the rear-side lower guide surface 342 are curved surfaces formed as part of the substantially arcuate shape.

Other structures are the same as those of the first embodiment.

In the present embodiment also, the front-side lower guide surface 341 is smoothly connected to the front side surface 31. Additionally, the rear-side lower guide surface 342 is smoothly connected to the rear side surface 32. In particular, the shape of the lower securing section 331 shown in FIG. 7 allows the front-side lower guide surface 341 and the rear-side lower guide surface 342 to be more smoothly connected to the front side surface 31 and the rear side surface 32, respectively.

Additionally, the operational advantages that are the same as those of the first embodiment are obtained.

The upper securing section 332 may have the same shape as the lower securing section 331 of the present embodiment.

Fourth Embodiment

Figure 8:
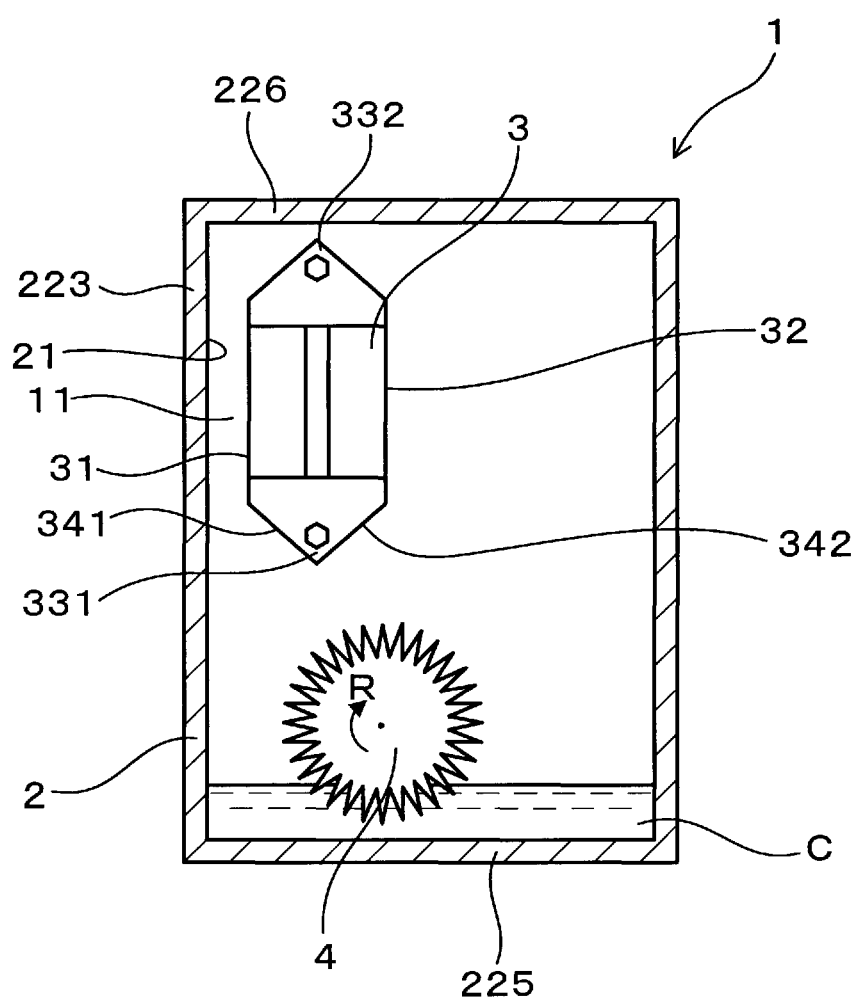
FIG. 8 is a cross-sectional explanatory diagram of a reactor cooling device according to a fourth embodiment.

As shown in FIG. 8, the present embodiment is an embodiment of the reactor cooling device 1 in which the front side surface 31 of the reactor 3 is located along the vertical direction.

In the present embodiment, the third wall 223 of the housing 2 stands upright in the vertical direction. As shown in FIG. 8, the reactor 3 is secured to the housing 2 so that the front side surface 31 extends along the wall surface 21, which is the inner wall surface of the third wall 223 standing upright in the vertical direction.

Other structures are the same as those of the first embodiment.

Like the first embodiment, the present embodiment also cools the reactor 3 efficiently.

Other structures are the same as those of the first embodiment.

The front side surface 31 of the reactor 3 may be located to face diagonally downward. The front side surface 31 may be located to be inclined with respect to the wall surface 21.

The present disclosure is not limited to the above embodiments and may be applied to various embodiments without departing from the scope of the disclosure.

Although the present disclosure has been described in accordance with the embodiments, it is understood that the present disclosure is not limited to the embodiments and the configurations. The present disclosure embraces various modifications and deformations that come within the range of equivalency. Additionally, various combinations and forms, or other combinations and forms including only one or more additional elements, or less than all elements are included in the scope and ideas obtainable from the present disclosure.

What is claimed is:

1. A reactor cooling device comprising:
   a housing in which a coolant is stored, the housing having an inner wall surface portion that includes an inner wall surface;
   a reactor that is arranged in the housing, the reactor being arranged to extend along part of the inner wall surface portion of the housing, the reactor including a front-side outer side surface that faces the inner wall surface;
   a rotating body that is rotatably located below the reactor in the housing, the rotating body and the reactor being located so as to at least partially overlap with each other in a previously selected one of turning radius directions of the rotating body, a part of the rotating body being immersed in the coolant stored in the housing, the inner wall surface facing the reactor in the previously selected turning radius direction of the rotating body, and the reactor cooling device is configured to cause a part of the coolant splashed by the rotation of the rotating body to be in contact with the reactor to thereby cool the reactor; and a coolant flow passage defined between the inner wall surface and the front-side outer side surface facing each other, the coolant flow passage being arranged to enable the part of the coolant splashed by the rotating body to flow through the coolant flow passage, such that the flow of the part of the coolant contacts the reactor and continues flowing past the reactor.

2. The reactor cooling device according to claim 1, wherein:

the inner wall surface is located to have a first distance relative to the front-side outer side surface in the coolant flow passage, the rotating body is located to have a second distance relative to the inner wall surface, and the first distance is shorter than the second distance.

3. The reactor cooling device according to claim 1, wherein:

the reactor includes a heater that produces heat, and a connector configured to secure the reactor to the housing, the connector includes a lower securing section located below the heater, and the lower securing section includes a front-side lower guide surface configured to be connected to the front-side outer side surface.

4. The reactor cooling device according to claim 3, wherein the reactor includes a rear-side outer side surface which is opposite to the front-side outer side surface, and the lower securing section includes a rear-side lower guide surface configured to be connected to the rear-side outer side surface.

5. The reactor cooling device according to claim 4, wherein the front-side lower guide surface and the rear-side lower guide surface have a boundary therebetween, and the boundary is located closer to the front-side outer side surface than to a center of the heater in a normal direction of the front-side outer side surface.

6. The reactor cooling device according to claim 4, wherein the connector includes an upper securing section located above the heater, and the upper securing section includes:

a front-side upper guide surface which is connected to the front-side outer side surface; and a rear-side upper guide surface which is connected to the rear-side outer side surface.

* * * * *